Figure 3:
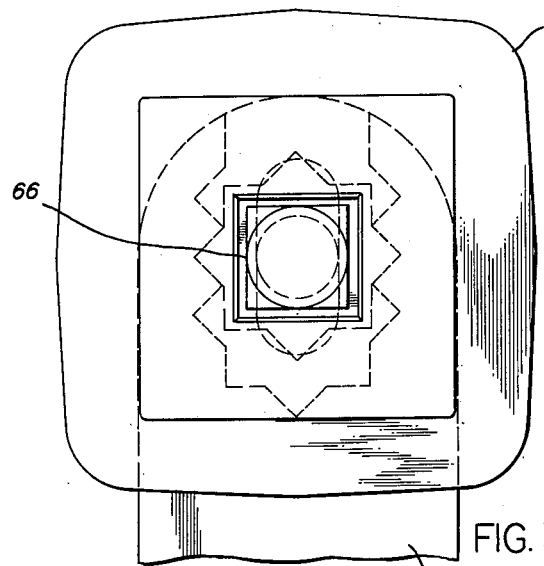

March 5, 1963     A. W. BOLLARD     3,080,151
MIXER
Filed April 25, 1957     2 Sheets-Sheet 1
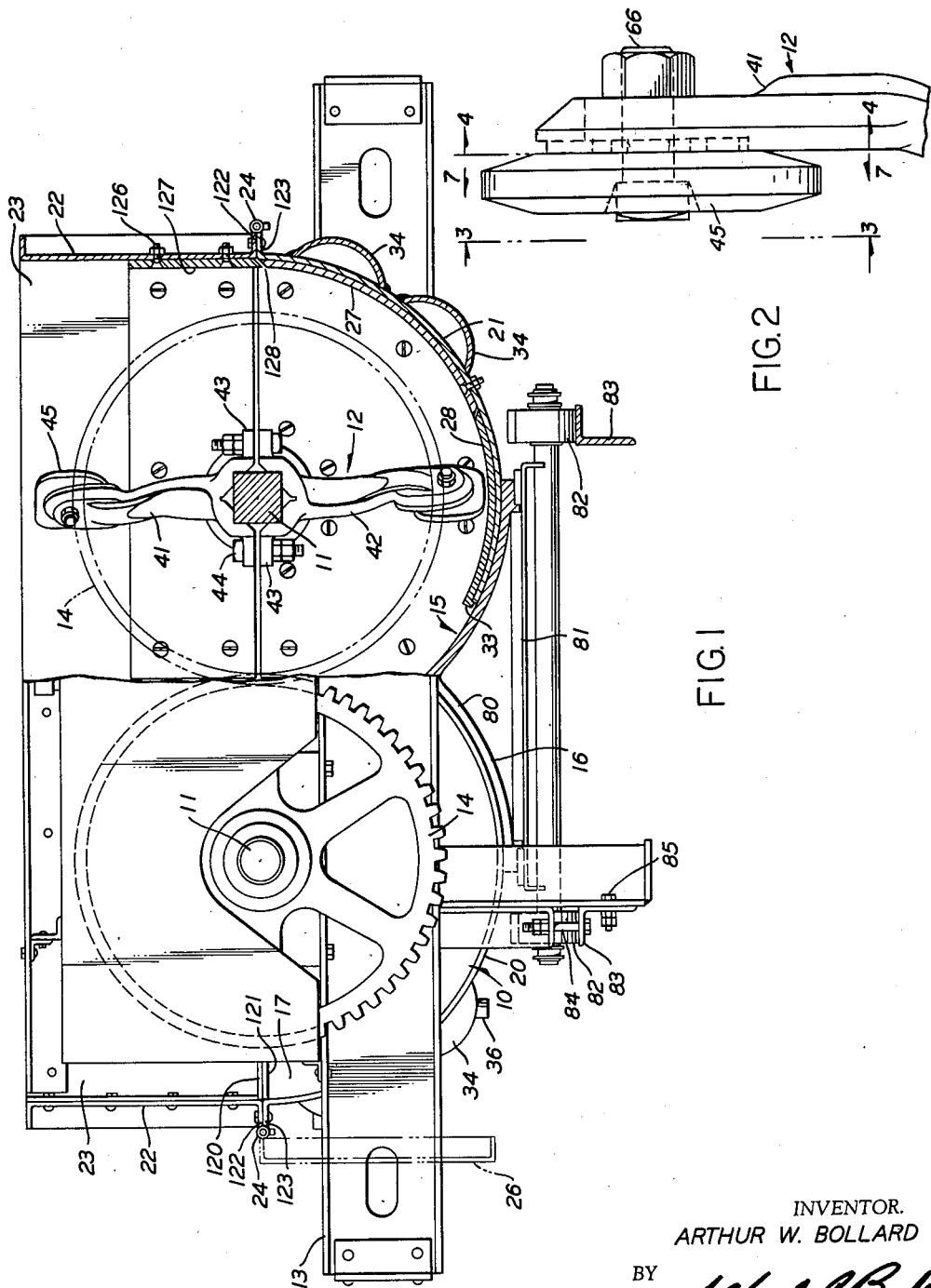
INVENTOR.
ARTHUR W. BOLLARD
BY
ATTORNEY.

March 5, 1963 A. W. BOLLARD 3,080,151
MIXER
Filed April 25, 1957 2 Sheets-Sheet 2

INVENTOR.
ARTHUR W. BOLLARD
BY
ATTORNEY.

United States Patent Office 3,080,151
Patented Mar. 5, 1963

3,080,151
MIXER
Arthur W. Bollard, Euclid, Ohio, assignor to The Colonial Iron Works Company, Cleveland, Ohio, a corporation of Ohio
Filed Apr. 25, 1957, Ser. No. 655,087
3 Claims. (Cl. 259—99)

The present invention relates to the art of mixing machines and, more in particular, to improvements in mixing machines for heavy abrasive materials which increase the life of the machine and make replacement of worn out parts simpler, easier and more economical.

Mixing machines now in use generally include an outer shell to hold the ingredients to be mixed and a rotary shaft or shafts having shanks to engage and mix the ingredients in the shell. These shanks often have adjustable tips on the ends thereof to compensate for wear. The shell is usually provided with an opening often in the bottom thereof, for passing the mixed ingredients and a gate for this opening. Usually some of the ingredients are quite abrasive and cause considerable wear on the shell and any bearings or rotating parts with which they come in contact. Since it is impossible to eliminate the abrasive deterioration of the machine, it is necessary to construct the machine in such manner that it will withstand as much abrasive wear as possible and yet may be easily repaired by inserting new parts when the old parts are abraded away. The parts in such mixing machines are generally quite large and heavy, thus requiring cranes or other lifting devices if they have to be lifted from the machine as well as overhead clearance. Often this latter is restricted by feed hoppers and the like.

The present invention contemplates structure in which these problems are greatly overcome by providing the machine with as many replaceable wear-resistant parts as possible and making these parts readily accessible so that they may be easily replaced when they become worn out by the abrasiveness of the ingredients being mixed or stirred.

The invention is particularly adapted to the mixing of bituminous mixtures and will be described with particular reference thereto.

In accordance with the invention, removable and replaceable tips are provided for the free ends of the shanks and having interengaging sockets and bosses so shaped and arranged that the tip may be both rotated and adjusted radially relative to a shank end.

Therefore, the present invention has for one of its objects the constructing of a mixing machine in such manner that as much abrasive wear as is possible is eliminated from the working parts of the machine.

Another object of the invention is to make all of the parts of the machine readily accessible so that they may easily be replaced when they become abraded and worn.

A still further object of the invention is to provide the mixing shank of a mixing machine and a tip with improved interengaging surfaces to permit ready adjustment of the tip relative to the shank.

Figure 4:
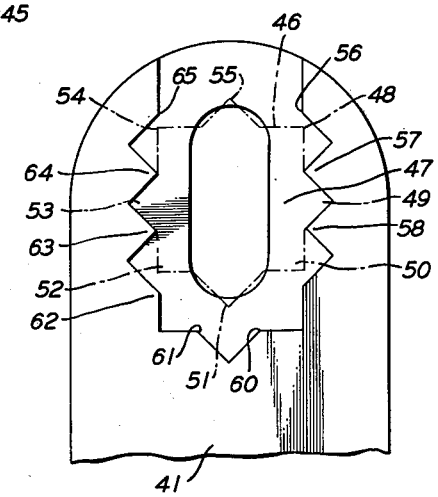
Figure 5:
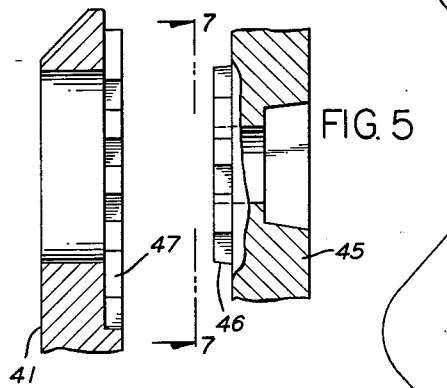
Figure 6:
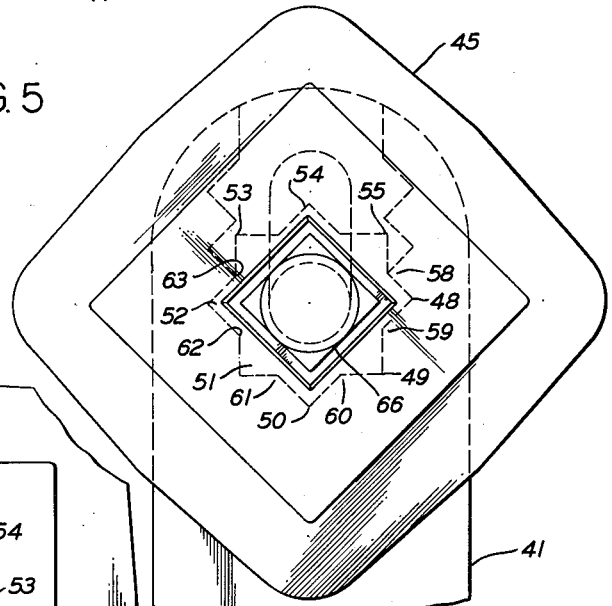
Figure 7:
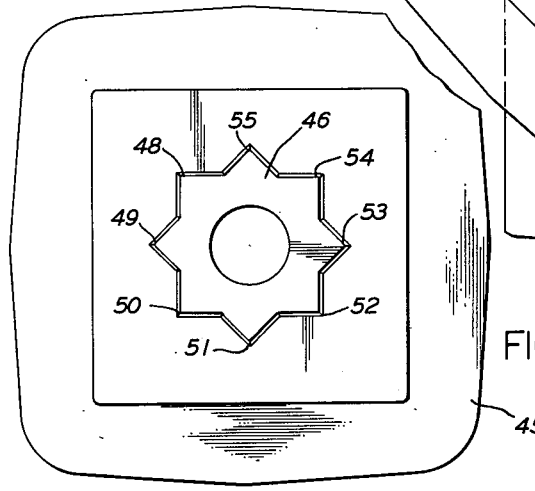

Other objects and a better understanding of the invention will become apparent from the following description of a preferred embodiment of the invention and the claims when taken in conjunction with the accompanying drawings in which:

FIGURE 1 is a cross-sectional view of a mixing machine incorporating the features of the present invention, FIGURE 2 is an edge view of the mixing shank and the tip secured thereto, FIGURE 3 is a plan view taken approximately along the line 3—3 of FIGURE 2, FIGURE 4 is a view taken approximately along the lines 4—4 of FIGURE 2, FIGURE 5 is a sectional view of the tip and the free end of the shank to show the construction thereof, FIGURE 6 is a view similar to that of FIGURE 3 and showing the tip in a different or an alternate position relative to the shank, and FIGURE 7 is a view taken along the line 7—7 of FIGURE 2 or FIGURE 5.

The drawings illustrate an embodiment of the invention for purposes of description only and without any intention of limiting the scope of the invention to the specific illustrations therein. The mixing machine illustrated in the drawing has a shell 10 in which at least one, and preferably a pair of mixing shafts, such as shaft 11, provided with radially extending shanks 12 rotate to mix materials such, for example, as bituminous mixtures, which is placed in the shell 10.

The shanks 12 are clamped to the shaft 11 at spaced intervals therealong and extend radially outwardly therefrom with each succeeding shank preferably being angularly offset from its next adjacent shank so that they form a somewhat spiral pattern along the shaft. The shanks 12 are easily secured to their respective portions of the shaft and without removing the shaft from the machine by making each shank in two identical portions 41 and 42. In FIGURE 1 these portions 41 and 42 are illustrated in mounted position on the shaft 11 and extending radially outwardly therefrom and on diametrically opposite sides. Each portion is provided with a shaft-engaging end having flanges such as flange 43 to receive bolts such as bolt 44 for bolting the portions 41 and 42 onto the shaft to form the shank 12. Angular positioning of the shank relative to the shaft is maintained so that the shank will be driven in a rotary movement by the shaft by keys or other suitable means such as providing a square portion, or the like, on the shaft and a square hole, or the like, in the shank. This type of mounting also permits easy adjustment angularly of the shanks so that each shank will lead the next succeeding shank, in this instance, by an angle of 45°. It is understood that other angles and other positions may be obtained by using a hexagonal, octagonal or other similar position means, securing the shanks to the shaft. The shanks have a total length approximately equal to and slightly less than the diameter of the partially cylindrical shell members, or each portion 41 or 42 of the shanks has a length approximately equal to the radius of the respective shell portion so that the free end of the shank will move in a circular path next adjacent the shell member.

The present invention provides a novel manner of adjustably mounting a tip 45 on the shank 12.

This adjustable position of the tip to a plurality of positions both radially of the shaft 11 or longitudinally of the shank portion and angularly about its own axis, is easily obtained by providing the tip with a star-shaped projection 46 and the free end of the shank portion with a multi-notched recess 47 to receive this projection with selected points of the projection 46 in selected notches of the recess 47 to hold the tip 45 in the desired position on the shank portion 41. It is understood that, if desired, the projection may be placed on the shank portion and the recess may be placed in the tip. The construction of the shank portion which provides the recess 47 and the projection 46 is best illustrated in the FIGURES 2 to 7 inclusive.

In this particular instance, the projection 46 is in the shape of an eight-pointed star having points 48 to 55 inclusive, with each point having a point diametrically opposite and the projection preferably always having an even number of evenly spaced points. These points extend in a common plane generally parallel with the plane of the main body portion of the tip and are on the side of the tip opposite the face thereof which engages the mixture, such as asphalt.

The free end of the shank portion 41 has a plurality of teeth generally defining the walls of the recess 47. As is best illustrated in FIGURE 4, these teeth which, for purposes of description, have been numbered 56 to 65 inclusive, are arranged in a somewhat U-shaped pattern with the teeth on the sides of the U being arranged in substantially straight lines. The teeth 56 to 65 inclusive are arranged so that any one of the points 48 to 55 inclusive, may be inserted between any pair of next adjacent teeth. In this instance when a point is between a pair of teeth on one side of the U, the diametrically opposite point is between a pair of teeth on the opposite side of the U, thereby positioning the tip longitudinally of the shank portion and in a desired angular position relative to its own axis.

For example, in FIGURES 3 and 4, the point 49 is positioned between the teeth 57 and 58 while the point 53 is positioned between the teeth 63 and 64 to hold the tip in the position illustrated and relative to the shank portion 41. If it is desired to have the tip 45 in its same angular position but at a distance from the shaft 11 greater or less than the distance which it would be in FIGURE 3, the teeth 49 and 53 may be inserted between the teeth 56—57 and 64—65 respectively, or between the teeth 58—59 and 62—63 respectively. In FIGURE 6 an alternate position of the tip 45 relative to the shank 41 is illustrated wherein the points 48 and 52 are between the teeth 58—59 and 62—63 respectively. It is also noted that this places the point 49 between the teeth 59 and 60, the point 50 between the teeth 60 and 61, and the point 51 between the teeth 61 and 62. The angular position of the tip in FIGURE 6 is thus different than the angular position of the tip in FIGURE 3.

After the points and teeth have been correctly positioned in the desired position with the star projection 46 in the recess 47, the tip 45 may be secured to the free end of the shank portion 41 by any suitable means such, for example, a bolt 66 extending through the tip and the elongated slot in the free end and longitudinally aligned with the sides of the recess 47 or with the sides of the U-shaped arrangement of the teeth.

The shanks on the rotary shafts are thus provided with replaceable, wear-resistant tips adjustably mounted on the free ends thereof in such manner that the tips may be easily adjusted longitudinally of the shank or angularly relative thereto and/or replaced very easily.

It is understood that various modifications in the details and arrangements of parts may be had without departing from the spirit and scope of the invention as hereinbefore described and hereinafter claimed.

Having thus described my invention, I claim:

1. In the combination of an elongated shank for a mixing machine, a rotating shaft said shank mounted on said shaft to rotate therewith, said shank having a free end portion remote from said shaft, and a removable tip mounted on said free end portion, a mounting portion on said removable tip, the improvement which comprises: one of said portions having a pointed star shaped projection which presents a plurality of points around its entire periphery and the other of said portions having a multi-notched radially elongated recess to receive said projections with selected points in selected notches, and single unitary attachment means at the center of the tip which releasably connects the tip to the shank and enables the tip to be adjusted lengthwise of the shank and to be turned about its center to position the tip in a desired radial or angular position on said shank.

2. In the combination of an elongated shank for a mixing machine, a rotating shaft, said shank mounted on said shaft to rotate therewith, said shank having a free end portion remote from said shaft, and a removable and adjustable tip mounted on said free end portion, said tip and shank having respectively a coacting projection and recess whereby the angle of the tip and its longitudinal position may be adjusted relatively to said shank, said projection in plain view being in the shape of a star haivng a plurality of evenly spaced points, said recess in plain view being generally in the shape of a U having sides each comprised of a plurality of equally spaced notches with the notches of one side being disposed opposite to the notches of the opposite side, said notches being of a dimension and so spaced as to receive and mate with said points of said projection, the base of said U being in the form of a single notch identical to the side notches, said shank having a radially elongated slot at the base of said recess midway between said opposite sides of the recess and a single unitary attachment means at the center of said tip which is slidably in said slot in the shank and releasably connects the tip to the shank, whereby said tip may be disposed at a plurality of different angles relative to the length of said shank and may have as many longitudinal positions along said shank as there are notches formed in one side of said recess.

3. In the combination of an elongated shank for a mixing machine, a rotating shaft, said shank mounted on said shaft to rotate therewith, said shank having a free end portion remote from said shaft, a removable tip mounted on said free end portion, a mounting portion on said removable tip, the improvement which comprises: one of said portions having a recess which is elongated laterally outwardly from the shaft and having a plurality of notches on opposite sides of said recess which are spaced apart along the recess in succession laterally outwardly from the shaft, the other of said portions having a substantially cylindrical projection which has a plurality of points spaced apart in succession around its periphery, said projection being shaped and dimensioned to be received in said recesses with a pair of said points sitting snugly in a pair of said notches on the opposite side of the recess to position the tip in a selected angular position on the shank at a selected location laterally outwardly from the shaft, and attachment means spaced from said inner-fitting points and recesses for releasably attaching said tip to said shank.

References Cited in the file of this patent

UNITED STATES PATENTS

| | | |
|---|---|---|
| 503,504 | Straker | Aug. 15, 1893 |
| 1,151 131 | Starliper | Aug. 24, 1915 |
| 1,555,964 | Guedel | Oct. 6, 1925 |
| 1,662,120 | Madsen | Mar. 13, 1928 |
| 1,697,643 | Gravell | Jan. 1, 1929 |
| 1,716,567 | Shonnard | June 11, 1929 |
| 1,741 013 | Cummer | Dec. 24, 1929 |
| 1,757,452 | Dellinger | May 6, 1930 |
| 1,911,608 | Davis et al. | May 30, 1933 |
| 1,969,545 | Bollard | Aug. 7, 1934 |
| 2,171,040 | Merritt et al. | Aug. 29, 1939 |
| 2 187,897 | Bollard | Jan. 23, 1940 |
| 2,285,583 | Jennings et al. | June 9, 1942 |
| 2,397,905 | Acton et al. | Apr. 9, 1946 |
| 2,415,711 | Sticelber | Feb. 11, 1947 |
| 2,570,042 | West | Oct. 2 1951 |
| 2,578,909 | Turner | Dec. 18, 1951 |
| 2,657,084 | Wiberg | Oct. 27, 1953 |
| 2,668,756 | Carney | Feb. 9, 1954 |
| 2,672,323 | Larson | Mar. 16, 1954 |
| 2 687,230 | McPherson | Aug. 24, 1954 |
| 2,710,763 | Gilbert | June 14, 1955 |
| 2,757,912 | Madsen | Aug. 7, 1956 |
| 2,772,860 | Nelson | Dec. 4, 1956 |